Sept. 12, 1944.  Z. J. ATLEE  2,358,200
GRID ASSEMBLY STRUCTURE
Filed Oct. 2, 1943
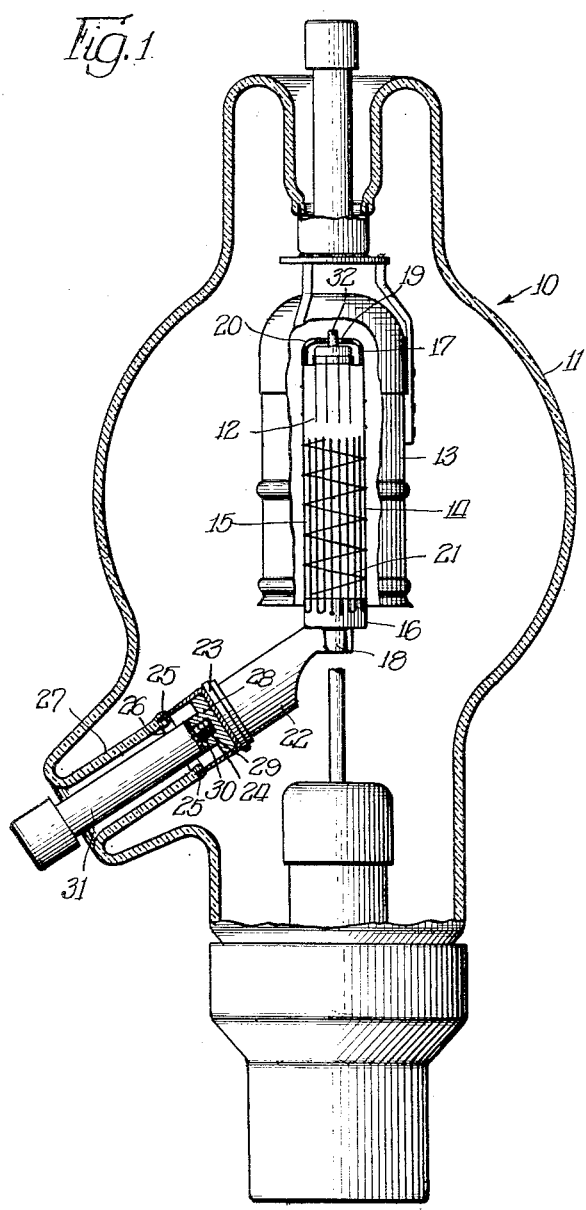
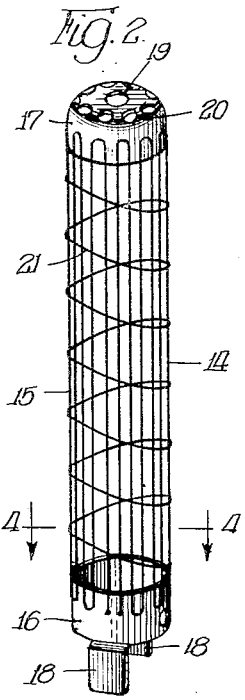
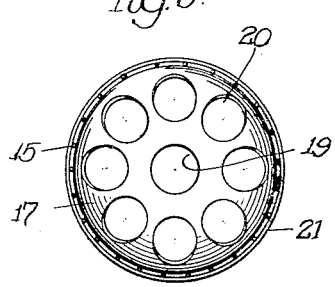
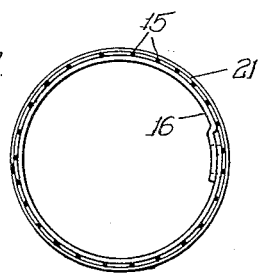
INVENTOR.
Zed J. Atlee,
BY
Spencer, Marzall, Johnston & Cook,
Attys.

Patented Sept. 12, 1944

2,358,200

UNITED STATES PATENT OFFICE 2,358,200

GRID ASSEMBLY STRUCTURE

Zed J. Atlee, Elmhurst, Ill., assignor to General Electric X-Ray Corporation, Chicago, Ill., a corporation of New York Application October 2, 1943, Serial No. 504,739

8 Claims. (Cl. 250—27.5)

The present invention relates to a grid assembly structure for thermionic tubes, particularly tubes used in high voltage operations, such as radar, X-ray, and other high voltage operations.

It is an important object of the present invention to provide a grid assembly structure for vacuum tubes used in high voltage operations that will withstand the high temperature conditions usually attending such operations. Another object of the invention is to provide a grid structure of relatively small mass so as to reduce the mechanical vibration within the tube and the ill effects consequent upon such vibration during high voltage operations. A further object of the invention is to provide a grid structure of relatively small surface area and thereby avoid excessive grid emission.

This invention further resides in the combination, construction and arrangement of parts illustrated in the accompanying drawing, and while there is shown therein preferred embodiments of the invention, it is to be understood that the same are susceptible of modification and change without departing from the spirit of the invention.

The accompanying drawing illustrates a selected embodiment of the invention, and the views therein are as follows:

Fig. 1 is a side elevation of a vacuum tube including an illustrative embodiment of the invention, partially broken away;

Fig. 2 is a perspective view of the grid structure shown in Fig. 1;

Fig. 3 is an end view looking downwardly in Fig. 2 of the grid structure there shown; and Fig. 4 is a sectional view taken along the line 4—4 of Fig. 2.

In the particular embodiment of the invention illustrated in the drawing, the three-electrode vacuum tube shown, designated generally by the numeral 10, comprises an evacuated glass envelope 11 and a cathode 12, an anode 13 and a grid 14, each operatively mounted in the envelope 11.

The grid 14 is of the cage type and comprises a wire 15, which is preferably made of platinum clad molybdenum, pure platinum or tantalum, and arranged in loops upon spaced supporting members 16 and 17 as best shown in Fig. 2. The bottom member 16 comprises a band of molybdenum having spaced depending lugs 18 formed integrally therewith. The upper member 17 is a generally cup shaped hat of molybdenum and has a central opening 19 and additional spaced openings 20. The single wire 15 is arranged upon the members 16 and 17 in generally tubular fashion, each loop and end of the wire being welded to an adjacent portion of the members 16 and 17, respectively. An additional wire 21 of material similar to that of the wire 15 is arranged upon the wire 15 in helical fashion and extends generally from the member 16 to the member 17. The wire 21 is preferably welded to the wire 15 at each crossing thereof.

The grid 14 is supported upon a generally tubular supporting member 22, which is preferably of molybdenum, nickel or steel and welded at one of its ends to the lugs 18. The member 22 is welded at its end remote from the lugs 18 to a steel plate 23, which is in turn welded to a sleeve member 24. The sleeve 24 is arranged with its outer edge 25 in glass-to-metal sealed relation with the adjacent peripheral portion of an opening 26 in re-entrant sleeve-like portion 27 of the glass envelope 11.

The sleeve 24 is adapted to receive a bushing 28 which is provided with a threaded bore 29 for receiving outwardly of the envelope 11, a threaded portion 30 of a removable electrical conductor or stud 31. The bushing 28, the sleeve 24 and the plate 23 are preferably welded together, as by copper brazing in a single welding operation, to form a sealed joint. Thus the grid 14 and the stud 31 are operatively interconnected.

The sleeve 24 and the bushing 28 are preferably made of 42% nickel steel or Kovar metal. The stud 31 may be of cold rolled steel nickel plated.

The central opening 19 of the grid is arranged to receive the upper portion 32 of a filament supporting stem. The openings 20 of the grid cap which are preferably arranged in radial spaced relation with the opening 19, serve to reduce the mass and surface area of the grid.

The improved grid assembly structure provides a high degree of rigidity and durability together with greatly increased efficiency of grid performance, including marked reduction of mechanical vibration and of grid emission.

Changes may be made in the form, construction and arrangement of the parts without departing from the spirit of the invention, and the right is hereby reserved to make all such changes as fairly fall within the scope of the following claims.

The invention is hereby claimed as follows:

1. A grid assembly structure comprising a generally tubular grid and a support for the grid, said grid comprising spaced annular supporting members, a grid wire mounted on said supporting members, said wire being arranged in a series of longitudinally extending spaced loops and forming a generally tubular structure, and a supplemental grid wire helically wound upon the periphery of said tubular structure and extending generally from one end of said tubular structure to the other end thereof, and one of said supporting members having a generally closed end portion, said end portion having a central opening and a plurality of supplemental openings in spaced relation with said central opening.

2. A grid assembly structure comprising a generally tubular grid and a support for the grid, said grid comprising spaced annular supporting members, a grid wire mounted on said supporting members, said wire being arranged in a series of longitudinally extending spaced loops and forming a generally tubular structure, each loop and end of said wire being welded to an adjacent portion of said supporting members, respectively, and a supplemental grid wire helically wound upon the periphery of said tubular structure and extending generally from one end of said tubular structure to the other end thereof, and one of said supporting members having a generally closed end portion, said end portion having a central opening and a plurality of supplemental openings in spaced relation with said central opening.

3. A grid assembly structure comprising a generally tubular grid and a support for the grid, said grid comprising spaced annular supporting members, a grid wire mounted on said supporting members, said wire being arranged in a series of longitudinally extending spaced loops and forming a generally tubular structure, each loop and end of said wire being welded to an adjacent portion of said supporting members, respectively, and a supplemental grid wire helically wound upon the periphery of said tubular structure and extending generally from one end of said tubular structure to the other end thereof, said supplemental grid wire being welded to said first mentioned grid wire at each crossing of said wires and at each end of supplemental wire, and one of said supporting members having a generally closed end portion, said end portion having a central opening and a plurality of supplemental openings in spaced relation with said central opening.

4. A grid assembly structure comprising a generally tubular grid and a support for the grid, said grid comprising spaced annular supporting members, a grid wire mounted on said supporting members, said wire being arranged in a series of longitudinally extending spaced loops and forming a generally tubular structure, each loop and end of said wire being welded to an adjacent portion of said supporting members, respectively, and a supplemental grid wire helically wound upon the periphery of said tubular structure and extending generally from one end of said tubular structure to the other end thereof, said supplemental grid wire being welded to said first mentioned grid wire at each crossing of said wires and at each end of supplemental wire, one of said supporting members having a generally closed end portion, said end portion having a central opening and a plurality of supplemental openings in spaced relation with said central opening, and the other of said supporting members being mounted upon said support.

5. An electronic tube comprising a glass envelope, said envelope having a re-entrant portion and an opening therein, and a grid assembly structure, said grid assembly structure comprising a generally tubular grid and a support for the grid, said grid comprising spaced, annular supporting members, a grid wire mounted on said supporting members, said wire being arranged in a series of longitudinally extending spaced loops and forming a generally tubular structure, and a supplemental grid wire helically wound upon the periphery of said tubular structure and extending generally from one end of said tubular structure to the other end thereof, one of said supporting members having a generally closed end portion, said end portion having a central opening and a plurality of supplemental openings in spaced relation with said central opening, the other of said supporting members being mounted upon said support, and said support being mounted on said envelope in glass-to-metal sealed relation with the peripheral portion of said envelope adjacent said opening.

6. A grid assembly structure comprising a generally tubular grid and a support for the grid, said grid comprising spaced, annular molybdenum supporting members, a grid wire mounted on said supporting members, said wire being arranged in a series of longitudinally extending spaced loops and forming a generally tubular structure, and a supplemental grid wire helically wound upon the periphery of said tubular structure and extending generally from one end of said tubular structure to the other end thereof, and one of said supporting members having a generally closed end portion, said end portion having a central opening and a plurality of supplemental openings in spaced relation with said central opening.

7. A grid assembly structure comprising a generally tubular grid and a support for the grid, said grid comprising spaced, annular molybdenum supporting members, a grid wire mounted on said supporting members, said wire being arranged in a series of longitudinally extending spaced loops and forming a generally tubular structure, and a supplemental grid wire helically wound upon the periphery of said tubular structure and extending generally from one end of said tubular structure to the other end thereof, said wires comprising platinum clad molybdenum, and one of said supporting members having a generally closed end portion, said end portion having a central opening and a plurality of supplemental openings in spaced relation with said central opening.

8. A grid assembly structure comprising a generally tubular grid and a support for the grid, said grid comprising spaced, annular molybdenum supporting members, a grid wire mounted on said supporting members, said wire being arranged in a series of longitudinally extending spaced loops and forming a generally tubular structure, and a supplemental grid wire helically wound upon the periphery of said tubular structure and extending generally from one end of said tubular structure to the other end thereof, said wires comprising platinum clad molybdenum, and one of said supporting members having a generally closed end portion, said support comprising a molybdenum supporting member, said end portion having a central opening and a plurality of supplemental openings in spaced relation with said central opening.

ZED J. ATLEE.